United States Patent
Gray, III et al.

(10) Patent No.: US 6,546,430 B2
(45) Date of Patent: *Apr. 8, 2003

(54) NEGOTIATING OPTIMUM PARAMETERS IN A SYSTEM OF INTERCONNECTED COMPONENTS

(75) Inventors: Donald M. Gray, III, San Francisco, CA (US); John R. Douceur, Bellevue, WA (US); Adam Glass, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/954,470

(22) Filed: Sep. 17, 2001

(65) Prior Publication Data

US 2002/0059469 A1 May 16, 2002

Related U.S. Application Data

(63) Continuation-in-part of application No. 08/639,289, filed on Apr. 25, 1996, now Pat. No. 6,304,917.

(51) Int. Cl.[7] .................................................. G06F 9/54
(52) U.S. Cl. ........................................... 709/310; 710/8
(58) Field of Search ................................ 709/310–320; 710/1–21

(56) References Cited

U.S. PATENT DOCUMENTS 5,289,585 A * 2/1994 Kock et al. ................. 710/113
5,606,599 A * 2/1997 O'Mahony et al. ...... 379/93.09
5,933,417 A * 8/1999 Rottoo ........................ 370/260

OTHER PUBLICATIONS

Miller, John A., et al., "The Active KDL object–oriented database system and its application to simulation support," Journal of Object–Oriented Programming, vol. 4, No. 4., pp. 30–45, Aug. 1991.*

* cited by examiner

Primary Examiner—St. John Courtenay, III
(74) Attorney, Agent, or Firm—Lee & Hayes, PLLC

(57) ABSTRACT

In a network of interconnected multimedia source, transfer, and sink ports, the described subject matter defers port parameter selection until substantially all relevant information is available. Specifically, parameters are negotiated between multiple ports by specifying parameter sets corresponding to the ports. Each parameter set is expressed as a list of constraints on allowable values or ranges of values. When connecting multiple ports, the constraints on their parameter sets are conjoined to form a parameter set intersection. The parameter sets of the ports are limited to values included in the parameter set intersection. Parameter sets relating to other ports are potentially limited based on the intersection results. The conjoining and limiting operations are repeated until the various parameter sets exhibit no further limitations in response to further repetitions. This process is repeated for all port interconnections. Subsequently, values for the port parameters are selected from the limited parameter sets.

47 Claims, 5 Drawing Sheets

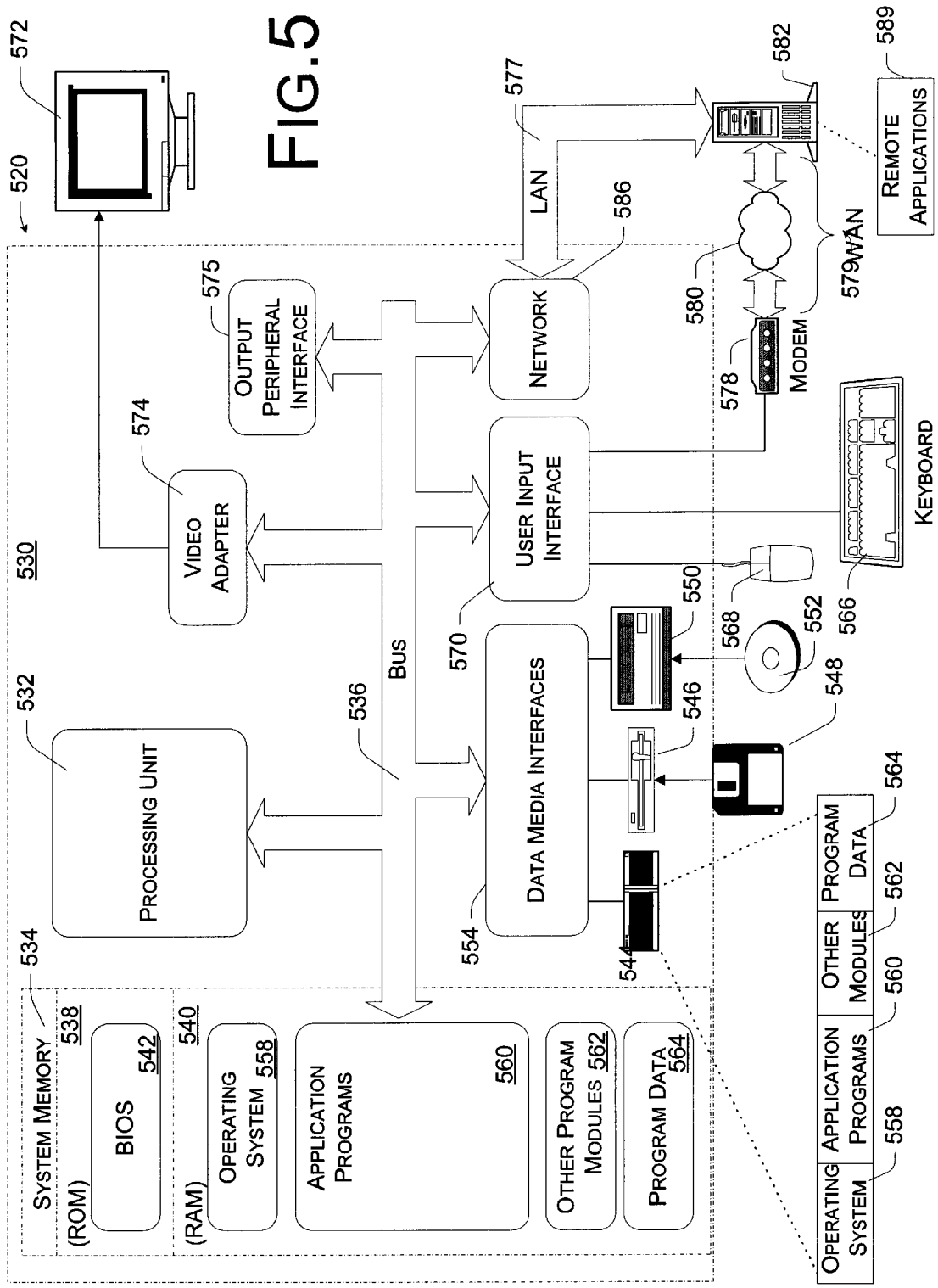

NEGOTIATING OPTIMUM PARAMETERS IN A SYSTEM OF INTERCONNECTED COMPONENTS

RELATED APPLICATIONS

This patent application is a continuation-in-part of U.S. patent application Ser. No. 08/639,289 filed Apr. 25, 1996, now U.S. Pat. No. 6,304,917, titled "Negotiating Optimum Parameters in a System of Interconnected Components", which is hereby incorporated by reference.

TECHNICAL FIELD

The described subject matter relates to network communications. More particularly, the subject matter pertains to arrangements and procedures to negotiate or select negotiable parameters used in the operation of networked components.

BACKGROUND

Multimedia information includes information that is interpretable by one or more of the five human senses such as sight and hearing. For example, video information is interpreted by the senses of sight and hearing. Audio information is interpreted by the sense of hearing.

There are many different types of systems in which multimedia signals or data are passed in a directed flow from source components (where the signals or data originate or enter the system), through transfer components (which may modify the signals or data), to sink components (where the signals or data terminate or exit the system). A multimedia distribution network is an example of such a system. In a multimedia content and services distribution network, audio and video data might originate from a gateway device (source component), pass through decompression components (transfer components), and be supplied to remote nodes (sink components) for viewing and listening.

FIG. 1 shows an example of a multimedia delivery and presentation system 100 of interconnected components. Functionally, the system retrieves a compressed stream of sampled data representing a video segment from a mass storage device 102, decompresses the data, and displays it on a display device 110. In addition to the two physical devices (mass storage device 102 and display device 110), the system includes a source component 104, a transfer component 106, and a sink component 108. Source component 104 is associated with a device driver 112, in this case a hard disk driver to handle details of communication with the mass storage device 102. The source component 104 retrieves data from the hard disk 102 at appropriate intervals and prepares or formats the data for subsequent handling by the transfer component 106. The transfer component 106 is associated with decompression software 114 for decompressing data into a format suitable for handling by video display hardware. The sink component 108 receives the decompressed data and subsequently associates it with a video display driver 116 for transferring the decompressed data to a video display card and the associated display device 110.

Traditionally, designers of multimedia delivery and presentation systems (e.g., the system of FIG. 1) specify individual components, along with various corresponding operational parameters (e.g., their individual propagation delays), and one or more direct connections between those components. The components, operational parameters, and direct connections are typically specified one at a time, in an arbitrary sequence.

Multimedia data exists in a number of different data formats and various communication protocols are available to transfer such data between networked devices. One issue that needs to be resolved, either by the components themselves or by the component assembly system on behalf of the components, is the format of the data as it is passed from each component to the next. It may be that each component supports a number of different operational parameter combinations such as data formats, communication speeds and/or protocols. However, it will often be the case that the different components do not support the same sets of operational parameters. (Hereinafter "operational parameters" in general are often to referred to as "format parameters").

One way to negotiate format parameters is to allow each connected group of components to negotiate among themselves as they are being connected. In the example of FIG. 1, source component 104 and transfer component 106 would initially negotiate to select an optimum set of format parameters supported by both of the components. Once this connection was completed, the transfer component 106 and sink component 108 would negotiate to select another set of format parameters supported by both of these components. In practice, each component would implement a negotiation interface which would be used to actively arbitrate with other components in determining a common communication format.

While this type of negotiation scheme might work in many situations, it does not always result in the optimum overall parameter selection. In this scheme, parameter decisions are made locally as individual components are connected. However, the most efficient parameter selection between two components may not be the most efficient selection when the entire path is considered.

For instance, it might be in the example of FIG. 1 that source component 104 and transfer component 106 both support a very efficient data format as well as a slightly less efficient data format, while sink component 108 supports only the less efficient format. Based on the scheme described above, the most efficient format would be chosen for the interconnection between source component 104 and transfer component 106. However, this format would not be available for the interconnection between transfer component 106 and sink component 108, so a format conversion would be required to convert the data to the less efficient format for subsequent transfer to sink component 108. In this situation, it would have been more efficient to select the less efficient format for all interconnections, thus avoiding the processing penalty of the format conversion.

In practice, the problem of choosing appropriate or optimum format parameters can become far more complex than indicated by the example of FIG. 1. For instance, each component may have multiple input ports and multiple output ports, each of which might be connected to a different component. In addition, a negotiated parameter selection on one port of a component might impose restrictions on the format parameters available at other ports of the same component. Furthermore, there may be a hierarchy of parameter information, such that making one decision in a negotiation not only affects the choices that can be made for other parameters, but even determines which other parameters are relevant to the negotiation.

Even the task of designing negotiation interfaces is problematic. For instance, it is difficult to define interfaces that effectively support radically different classes of communication formats, since each class may require a substantially different form of negotiation. Furthermore, implementation of a negotiation interface requires a high degree of intelligence in each component, thus impeding the automation of the negotiation process. This requirement for component-level intelligence places a significant burden on the implementer of each component. One mechanism that can be employed to ease this burden is the creation of generic ports, which are component ports that contain all of the basic logic for data exchange and parameter negotiation, yet are not specific to any type of component. These generic ports can be instantiated by the component designer and modified as necessary to support the component's negotiation needs. However, since the negotiation interface that each port presents is so heavily dependent upon the classes of communication formats that are supported by the port's component, definition and implementation of generic ports is a difficult problem, and one that has no obvious solution.

It is apparent that the previously proposed methods of negotiating or selecting communication parameters for use among groups of interconnected components have a number of problems. The following subject matter addresses these problems and allows parameters to be selected to provide the optimum overall performance.

SUMMARY

In a distributed network of interconnected multimedia source, transfer, and sink components, the described arrangements and procedures defer parameter selection until all relevant information is available. Parameter decisions are made only after all allowable values are known for each component port in light of the specified interconnections between components. Specifically, a parameter set is specified for each port. The parameter set indicates the allowable values for each parameter relevant to the communication formats supported by the component for the port. Each parameter set is expressed as a Boolean expression of constraints. A constraint is expressed as a parameter identifier and a value scope. A value scope comprises a list of allowed single values and of allowed ranges of values.

When ports of components are to be interconnected, the constraints on the parameter sets of the ports are conjoined to form a parameter set intersection. The intersection of the parameter sets is made available to each of the components participating in the connection, who may use the information in the intersection to limit the values of the parameter sets on the participating ports or other ports of the components to reflect parameter interdependencies within a port or among the component's ports.

As new port interconnections are made, parameter sets of the connected ports are intersected and parameter sets within the interconnected components are appropriately limited. After the components limit their parameter sets, the parameter set intersections are recalculated and further limited based on the recalculations. This process is repeated a number of times until further repetitions result in no further limitations of the various parameter sets.

When all interconnections have been made and the parameter sets have converged through cycles of intersection and limitation, values for the negotiable parameters are selected from the final parameter sets. These values are chosen to yield the most efficient overall system rather than to optimize the system on only a local or port-to-port basis.

BRIEF DESCRIPTION OF THE DRAWINGS

FIG. 4 shows further detail of the operation of conjoining multiple parameter sets.

FIG. 5 illustrates an exemplary system that provides a suitable operating environment to determine substantially optimal operational parameters sets between interconnected components.

DETAILED DESCRIPTION

The described arrangements and procedures extend to the communication of multimedia data in a networked environment between source, transfer, and sink components. This communication is over heterogeneous networks. When I/O ports of various networked components are to be interconnected, the constraints on the parameter sets of the ports are conjoined to form a parameter set intersection. The intersection of the parameter sets is made available to each of the components participating in the connection, which may use the information in the intersection to limit the values of the parameter sets on the participating ports or other ports of the components, in order to reflect parameter interdependencies within a port or among the component's ports.

An Exemplary System for Negotiating Negotiable Parameters

Figure 1:
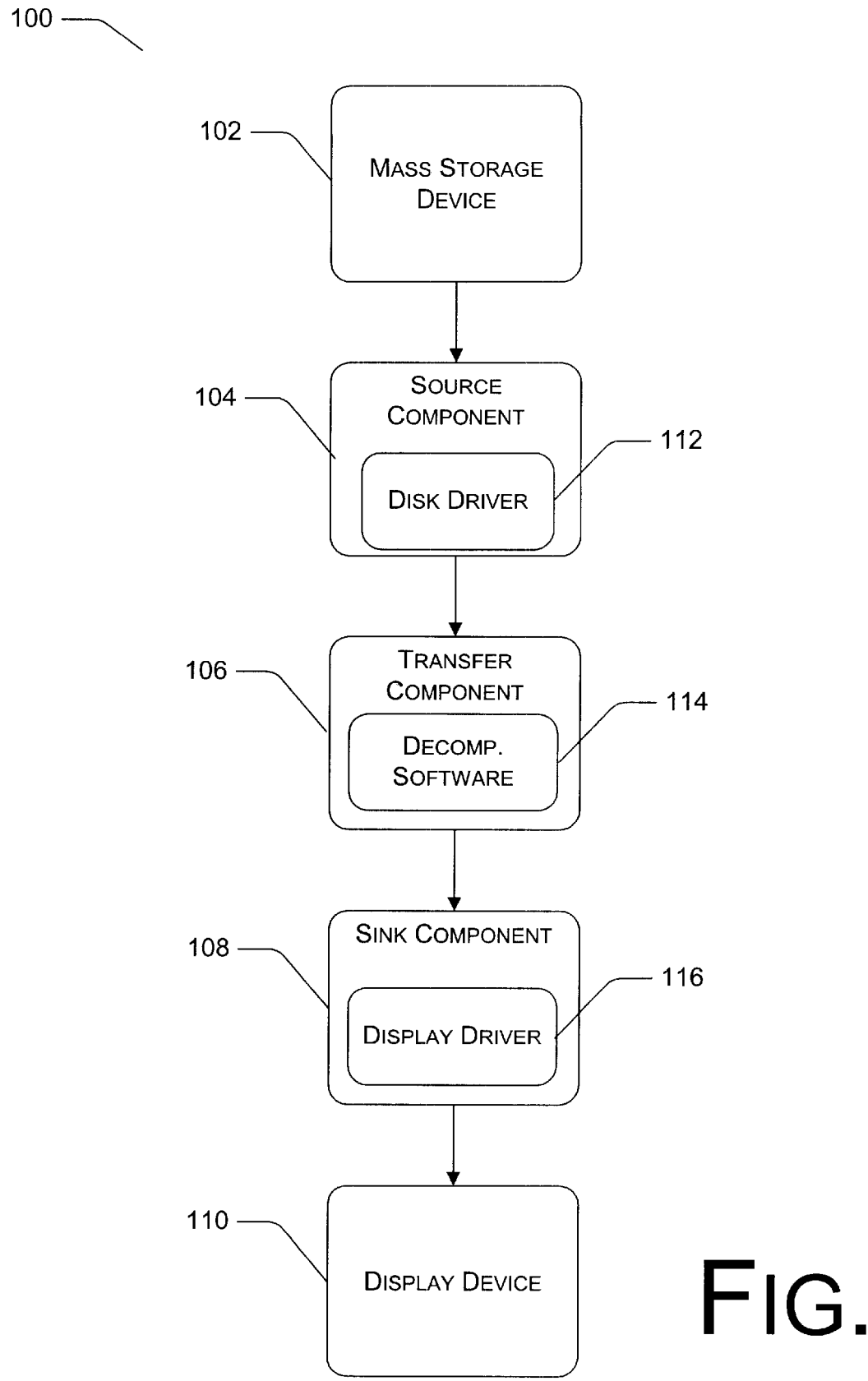
FIG. 1 is a block diagram of a networked multimedia distribution system of interconnected software components.
Figure 2:
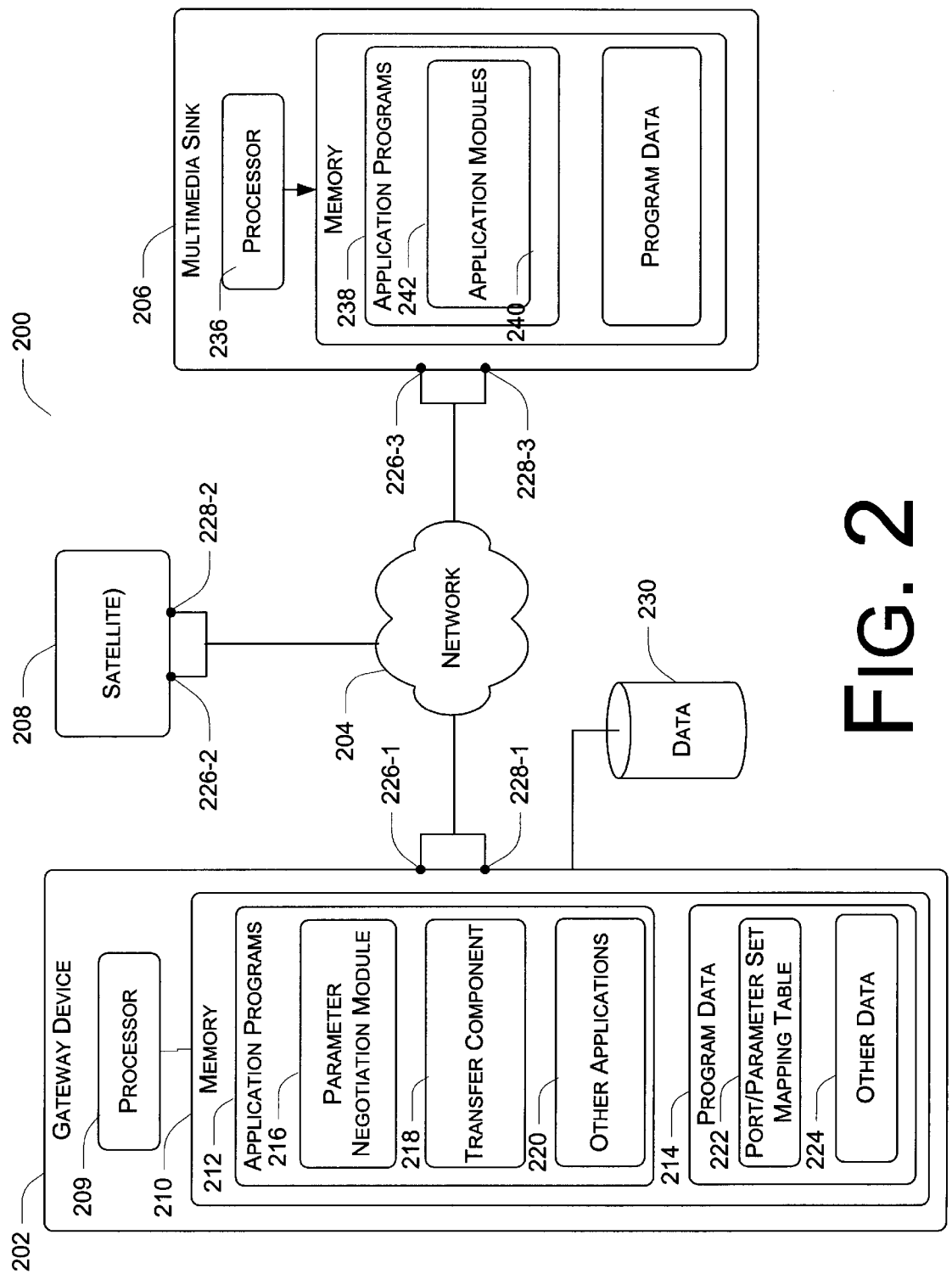
FIG. 2 is a block diagram showing aspects of an exemplary distributed multimedia distribution and presentation system, wherein substantially optimal operational parameters are determined between interconnected components.

FIG. 2 is a block diagram showing aspects of an exemplary distributed multimedia distribution and presentation system 200, wherein substantially optimal operational parameters are determined between interconnected components. The system includes a gateway device 202 coupled across a network 204 to any number of client nodes 206. The gateway device is a source component in that it distributes digital content (e.g., content obtained from another multimedia source such as from a satellite 208) to the one or more client nodes. The client nodes (e.g., one or more audio/visual ("A/V") nodes) are multimedia sinks in that the client nodes receive content from the gateway device for subsequent presentation.

The gateway device includes a processor 209 that is coupled to a system memory 210. The system memory includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and/or the like.

The processor 209 is configured to fetch and execute computer program instructions from application programs 212 such as the parameter negotiation module 216, the transfer component module 218, and other applications such as an operating system, digital satellite signal (DSS) tuning modules, device drivers, and so on. The processor is also configured to fetch program data 214 from the system memory in response to executing the application programs.

The parameter negotiation module 216 negotiates a substantially optimal set of parameters with which to interoperate with other interconnected components, the processor 209 fetches, reads, and/or writes information to/from the port/parameter set mapping table 228 to associate these negotiated parameters with the specific interconnection. Exemplary techniques to negotiate such parameters are described in greater detail below in reference to FIGS. 3 and 4.

The transfer component 218 modifies signals or data. For example, responsive to a client 206 request for multimedia content, the transfer component coverts multimedia data 224 from a first data format (e.g., an XML data format) into a second data format (e.g., an MPEG data format) specified by the client device. The transfer component uses the port/ parameter set mapping table 222 to determine the substantially optimal parameters with which to interoperate with the client.

The gateway device 202 is optionally coupled to database 230 for storing multimedia content (e.g., content received from the satellite 208) for subsequent delivery to one or more multimedia data sinks 206. When the gateway device receives content from another device such as a satellite, the gateway device is also exhibiting aspects of a sink device. The database is an object-oriented database such as an Extensible Markup Language (XML) database, a Hypertext Markup Language (HTML) database, an SQL server database, and/or the like.

As described, the gateway device 202 is coupled across the network 204 to one or more multimedia sinks 206. The network is a communication medium such as a parallel connection, a packet switched network (e.g., an organizational intranet network), the Internet, and/or other communication configurations that provide electronic exchange of information between the satellite 208, the gateway device 202, and the multimedia sinks 206 using an appropriate protocol (e.g., TCP/IP, UDP, SOAP, etc.).

A multimedia sink 206 is a computing device such as a home entertainment system that is used to present and/or recording programming. A "home entertainment system" may be a display unit, such as a television screen, coupled to a processing device for performing the data processing acts and steps disclosed herein, or may include any number of interconnected consumer electronic devices, one of which having a processing device for performing the data processing disclosed herein.

Examples of such consumer electronic devices include a video cassette recorder ("VCR"), a video game system, a stereo system, a television or monitor with data processing capabilities, a cable television box, a digital satellite system receiver ("DSS"), a digital video broadcasting system ("DVB"), a digital versatile disc system ("DVD"), a compact disk read-only memory system ("CD-ROM"), a set-top box that serves as an Internet terminal, and any other device capable of processing data as described herein. Furthermore, the term "home entertainment system" is to be understood as a term that broadly describes a television-viewing or music listening environment, whether it is located in a viewer's home, at a place of business, in the public, or at any other location. The term "programming" includes both the viewable and non-viewable portions of moving image data and/or its associated sound data.

Each multimedia sink 206 includes a processor 234 that is coupled to a system memory 236. The system memory includes any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and/or the like.

The processor 236 is configured to fetch and execute computer program instructions from application programs 238 such as computer program modules 242 (e.g., an operating system, audio/visual presentation modules, device drivers, a Web browser, and so on). The processor is also configured to fetch program data 238 from the system memory in response to executing the application programs.

The various software modules 242 provide information relating to their internal capabilities to the parameter negotiation module 216 of the gateway device 202 to determine a substantially optimal parameter set with which to configure I/O between the gateway device 202 and the various software modules. Other divisions of responsibility are also possible. For instance, it might be desirable in some situations to assign greater responsibilities to the components themselves, or to incorporate a connection agent (not shown) in each multimedia sink 206 to coordinate communications between a sink's internal modules and the gateway's parameter negotiation module.

I/O Ports

Each component in the system includes respective input ports 226 and/or output ports 228 for communicating information between the respective components. These ports represent any number of input ports and output ports corresponding to the respective components. Interconnections between components refer to the various I/O port couplings between physical devices such as between satellites 208, gateway devices 202, and the one or more multimedia sinks 206. Interconnections also refer to the various I/O port couplings between software components of such devices.

Each I/O port 226 and 228 supports a specific domain of negotiable parameters relating to formatting or other characteristics of data or control signals that are to be transferred into or out of the respective port. For instance, a particular negotiable parameter might relate to the allowed speeds of data transmission. Another parameter might relate to the compression protocol used to compress and decompress the data. The object of the parameter-selection process is to select parameters for each interconnection, wherein the selected parameters are supported by all of the ports involved in the interconnection.

For example, consider an interconnection wherein the satellite component 208 streams multimedia content to the gateway device 202. The gateway's transfer component 216 converts the streamed data from the satellite's data format to one (e.g., an XML data format, an MPEG data format, etc.) that is suitable for subsequent delivery to one or more multimedia sinks 206. The gateway device then stores the converted data in the database 230. In this example, an optimal parameter set will include parameters that are supported by each of the following: the satellite data output ports 228-2, and respective data input ports 226-1 for the data transfer module 216 and the database 230.

While the four-component system shown is adequate for illustrating the arrangements and techniques to negotiate parameters between interconnected components, the subject matter can be used in conjunction with any number of interconnected components (e.g., a gateway device 202 communicating multimedia content to multiple and variously configured multimedia sinks 206), each of which can have any number of I/O ports 226 and 228, and each port of which may be connected to any number of other ports.

Exemplary Procedure to Negotiate Negotiable Parameters Among Ports

Figure 3:
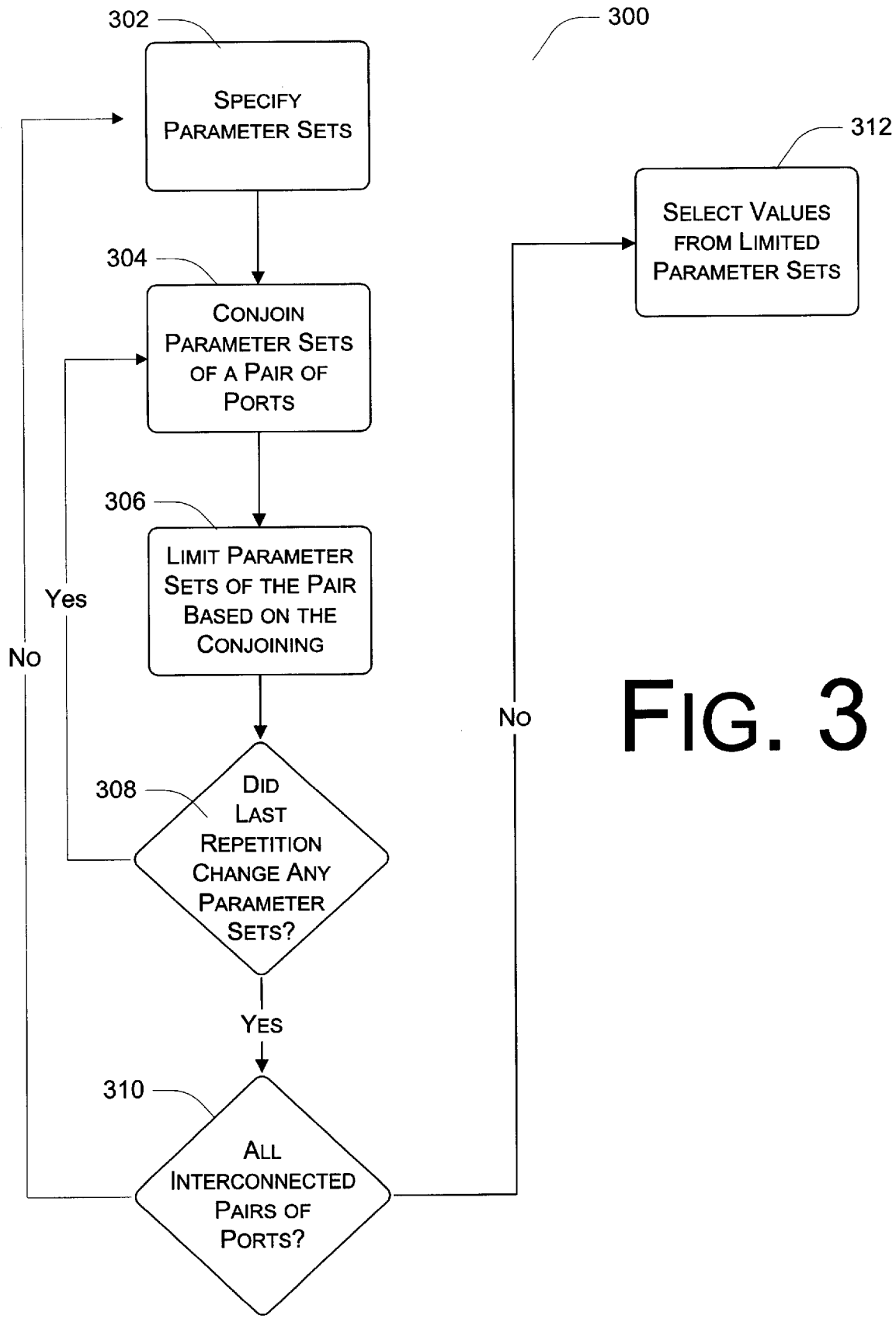
FIG. 3 is a flow chart showing aspects of an exemplary procedure to determine substantially optimal parameter sets between interconnected components.

FIG. 3 shows an exemplary procedure to negotiate negotiable parameters among a plurality of ports. The parameter negotiation 216 of FIG. 2 is configured to perform the operations of this exemplary procedure in conjunction with the various software modules 242 that provide information relating to their internal capabilities to the negotiation module.

At block 302 at least two components specify parameter sets corresponding respectively to at least two of the ports. Each parameter set indicates the limited domain of negotiable parameters supported by a particular component for the corresponding port. In practice, a parameter set is specified for at least a subset of the ports 226 and 228 of FIG. 2.

Parameter set specification comprises specifying one or more constraints on negotiable parameter values. Each constraint is specified as a parameter identifier with a corresponding value scope. A value scope is specified as one or more single values and/or as one or more ranges of values. As an example, the following is a symbolic representation of an individual constraint on a parameter value:

MODE={STEREO}

In this example, MODE is a parameter identifier representing a particular negotiable parameter. The curly braces are used to delimit the value scope. Here, STEREO defines a value scope having a single value. This example represents the parameter constraint that MODE must be equal to the value STEREO.

Below is another example of a parameter constraint:

RATE={<10:40>}

In this example, RATE is a parameter identifier representing another negotiable parameter. This parameter can have values in the range of 10 to 40. The values within the angle brackets, separated by a colon, indicate the lower and upper limits of the range. The ranges are specified as open intervals, meaning that they do not include the specified endpoints.

Single values and ranges of values can be combined in a single constraint specification such as the one below:

RATE={10, <30:40>}

This constraint limits RATE to either the exact value 10 or to a value between 30 and 40, excluding the endpoints. In general, each constraint includes a list of values and ranges, separated by commas within curly brackets. Such an expression is a listing of all allowable values for a particular parameter. The commas thus indicate disjunction of the listed values and ranges.

A parameter set is further defined by formulating Boolean expressions of the constraints. For example:

(MODE={STEREO} & RATE={<10:40>})|

(MODE={MONO} & RATE={<10:60>})

where the "&" symbol indicates conjunction, the "|" symbol represents disjunction, and the parentheses indicate order of evaluation. This expression indicates that a port supports data rates in the range of 10 to 40 samples per second when operating in stereo mode, and data rates in the range of 10 to 60 samples per second when operating in monaural mode.

More complicated relationships between parameters can be expressed either explicitly or implicitly. For example, suppose that a parameter X is constrained to be greater than another parameter Y, and both are constrained to be in the range of 0 to 100. The following expression expresses this explicitly, with some loss of usable parameter values due to discretization of intervals:

(X={<1, 100>} & Y={0})|

(X={<26, 100>} & Y={<0, 25>})|

(X={<51, 100>} & Y={<0, 50>})|

(X={<76, 100>} & Y={<0, 75>})|

(X={100} & Y={<0, 99>})

This same relationship could be expressed implicitly by dynamically altering the constraints on the parameters in response to the taking of a set intersection. This process will be described in more detail below. The advantage of this approach is that the relationship is preserved without discretization loss; the disadvantage is that more intelligence is required within the component. The decision of which approach to follow is left to the implementer of the component.

Representing the capabilities of ports in this manner has several advantages.

Parameter information is represented in a very standard fashion; the domain of each parameter is simply a set of parameter values.

Implementation of negotiation interfaces for use between components requires minimal intelligence in each component; all that is needed is for the component to control the relationship between constraints on the parameter sets of its various ports.

Defining a generic port is trivial. The port initially specifies no constraints; once it is connected to another port, its component assigns to its other ports the parameter set from the connected port.

The negotiation process is readily automated. As will be described below, a connecting agent needs only to perform a set intersection to determine the set of parameters that are supported by the resulting system of components.

At block 302 of FIG. 3, a connection among a group of ports is specified. If connections have been specified prior to beginning the described parameter selection techniques, then this operation is equivalent to selecting one of the specified connections.

At block 304, the parameter negotiation module intersects the (block 302) specified parameter sets associated with the ports involved in the interconnection. This is accomplished by conjoining each of the Boolean parameter set expressions as described below in greater detail in reference to FIG. 4.

At block 306, the parameter sets of one or more ports of the components being interconnected are limited based on the results of the conjoining operation of block 304. At a minimum, the parameter sets of the ports being interconnected are limited to their parameter set intersection. One or more of these sets may also be limited to implicitly express an interrelationship among the parameters of the port.

For example, a port may explicitly constrain the values of two parameters, X and Y, to be within the range 0 to 100, and it may also require that X be greater than Y. This latter requirement may be expressed implicitly by limiting the range of each parameter in response to any constraints on the other parameter. Suppose that, after the set intersection is taken, parameter X is constrained to be in the range 10 to 40, and parameter Y is constrained to be in the range 25 to 50. Limiting the range of X to 26 to 40 and limiting the range of Y to 25 to 39 can express the requirement that X be greater than Y. As described below, repetitions of this process can insure that the constraint is satisfied. In addition, parameter sets of component ports other than those being interconnected might be limited, depending on the characteristics and capabilities of the components.

For instance, if a particular port being interconnected has its parameter set limited to a particular data compression format, it might be necessary to limit the parameter sets of other ports of the same component to require that same data compression format. In general, the parameter sets of various ports of a single component are limited to satisfy any dependencies they might have upon another port whose parameter set has been limited.

At block 308, the parameter negotiation module determines whether the limiting operation (i.e., see, block 306) caused any changes in the values of parameter sets and, if there were any such changes, repeating blocks 304 and 306 on the parameter sets of the affected ports. This repetition continues until no further changes in the values of the parameter sets are made, at which point the parameter sets have converged to stable values.

In the above example, the limiting operation (block 306) did affect the values of the parameter sets for parameters X and Y for at least one of the ports, so the intersection of the parameter sets of the interconnection is again taken. Suppose that this intersection produces a constraint range of 26 to 32 for X and a constraint range of 28 to 39 for Y. The limiting step will again insure that X is greater than Y by limiting the range of X to 29 to 32 and the range of Y to 28 to 31.

Since this limitation operation (block 306) caused a change in values of the parameter sets, the intersection is taken yet again. Eventually, the process will converge, because the scope of the parameter sets is always reduced on each pass through the loop. At the conclusion of the loop, either a valid range that satisfies all requirements will have been found, or the null set will have been reached, the latter indicating that there does not exist a set of parameters which satisfies all of the constraints in the system.

At block 310, if the parameter negotiation module determines that there are more connections to specify for the system, block 302–310 are repeated. Otherwise, at block 312, the parameter negotiation module selects values for the negotiable parameters from the parameter set intersections. Specifically, for a particular group of ports, values are selected from the parameter sets of the ports as limited by the above steps or from the ultimate parameter set intersections corresponding to the interconnection between the ports. However, it is possible after performing the steps described above to select parameters based on the parameter sets of a number of the ports that are to be interconnected, so that an overall optimum parameter combination can be determined. This results from the fact that parameters are not actually selected until the parameter sets for all ports have been appropriately limited. Because of this, it is possible to avoid local connection formats that are detrimental to overall efficiency of the system.

Figure 4:
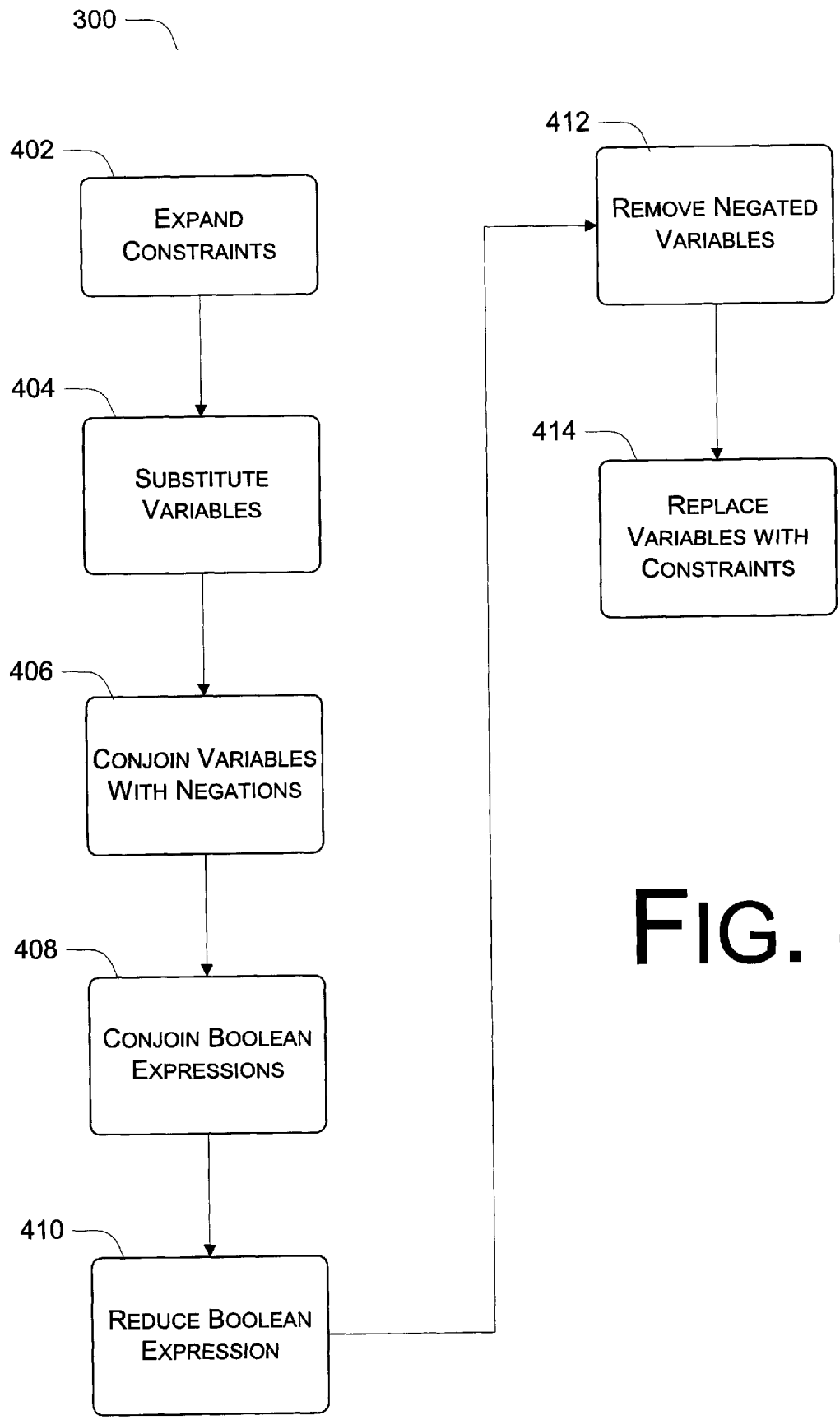
FIG. 4 is a flow chart showing further aspects of an exemplary procedure to determine substantially optimal parameter sets between interconnected components. In particular.

FIG. 4 shows further aspects of an exemplary procedure to negotiate negotiable parameters among a plurality of ports. Specifically, FIG. 4 illustrates further details of the conjoining parameter sets for a pair (2) of ports (i.e., see, block 304 of FIG. 3). The first parameter set is represented as:

A={2, <3:6>}|B={2}

The second parameter set of the example is as follows:

A={<1:4>} & B={2, 5, 10}

The intersection of these sets is $(A=\{2, <3:4>\} \& B=\{5, 10\})|(A=\{<1:4>\} \& B=\{2\})$ At block 402, the parameter sets (see, block 302 of FIG. 3) are intersected by logically expanding any constraints in the parameter set expression that relate to a common negotiated parameter into a plurality of constraints that are mutually exclusive. In other words, each parameter set expression is re-written so that no range spans a critical value. A critical value is one which is explicitly enumerated in the expressions for any of the parameter sets being intersected. In the example, the critical values for parameter A are 1, 2, 3, 4, and 6. The critical values for parameter B are 2, 5, and 10. One of the constraints relating to parameter A includes the range <3:6>, which spans the critical value 4 for A. In accordance with step 32, this range is rewritten as:

<3:4>, 4, <4:6>

Recalling that the ranges specify open intervals, the above expression can be seen to include all values which are greater than 3 and less than 4, the exact value 4, and all values which are greater than 4 and less than 6. The constraint specified by this expression is clearly equivalent to that specified by the original expression, namely all values which are greater than 3 and less than 6. The results of rewriting each parameter set so that no range spans a critical value are as follows:

A={2, <3:4>, 4, <4:6>}|B={2} and

A={<1:2>, 2, <2:3>, 3, <3:4>} & B={2, 5, 10}

Block 402 further includes expanding the number of constraints in each of these expressions so that the disjunction of values and ranges is explicit. This results in:

A=2|A=<3:4>|A=4|A=<4:6>B=2 and (A=<1:2>|A=2|A=<2:3>|A=3|A=<3:4>)&(B=2|B=5B=10)

At block 404, the parameter negotiation module (i.e., the module 216 of FIG. 2) substitutes a corresponding variable symbol for each of the different constraints in each of the resulting expressions. There are 7 different constraints relating to A, so these constraints are replaced with the variables $A_0$ through $A_6$. Similarly, there are three different constraints relating to B, so these constraints are replaced with the variables $B_0$ through $B_2$. Table 1 below shows the substitutions made in the example.

TABLE 1

| Constraint | Variable |
|---|---|
| A = 2 | $A_0$ |
| A = <3:4> | $A_1$ |
| A = 4 | $A_2$ |
| A = <4:6> | $A_3$ |
| A = <1:2> | $A_4$ |
| A = <2:3> | $A_5$ |
| A = 3 | $A_6$ |
| B = 2 | $B_0$ |
| B = 5 | $B_1$ |
| B = 10 | $B_2$ |

These substitutions result in the following Boolean expressions for the example:

$A_0|A_1|A_2|A_3|B_0$ and $(A_4 A_0|A_5|A_6|A_1) \& (B_0|B_1|B_2)$

At block 406 (after the variable substitution of block 404), the procedure logically conjoins each variable symbol substituted for a constraint that relates to a particular negotiated parameter with the negation of all other variable symbols substituted for constraints relating to the same negotiated parameter.

For instance, $A_0$ is conjoined, each time it occurs in one of the above expressions, with the negation of variables $A_1$ through $A_6$ (since each of variables $A_0$ through $A_6$ was substituted for a constraint relating to parameter A). The result of this step, when performed with every variable occurring in each of the expressions, is as follows (in which an exclamation point indicates negation):

$(A_0\&!A_1\&!A_2\&!A_3\&!A_4\&!A_5\&!A_6)|$
$(!A_0\&A_1\&!A_2\&!A_3\&!A_4\&!A_5\&!A_6)|$
$(!A_0\&!A_1\&!A_2\&!A_3\&!A_4\&!A_5\&!A_6)|$
$(!A_0\&!A_1\&!A_2\&A_3\&!A_4\&!A_5\&!A_6)|$
$(B_0\&!B_1\&!B_2)$ and
(
   (!A0&!A1&!A2&!A3&A4&!A5&!A6)|
   (A0&!A1&!A2&!A3&!A4&!A5&!A6)|
   (!A0&!A1&!A2&!A3&!A4&A5&!A6)|
   (!A0&!A1&!A2&!A3&!A4&!A5&A6)|
   (!A0&A1&!A2&!A3&!A4&!A5&!A6)
)&
(
   (B0&!B1&!B2)|
   (!B0&B1&!B2)|
   (!B0&!B1&B2)
)

This operation effectively conjoins each constraint relating to a particular negotiated parameter with the negation of all other constraints relating to the same negotiated parameter.

At block 408, the procedure logically conjoins the manipulated Boolean expressions:

(
   $(A_0\&!A_1\&!A_2\&!A_3\&!A_4\&!A_5\&!A_6)|$
   $(!A_0\&A_1\&!A_2\&!A_3\&!A_4\&!A_5\&!A_6)|$
   $(!A_0\&!A_1\&A_2\&!A_3\&!A_4\&!A_5\&!A_6)|$
   $(!A_0\&!A_1\&!A_2\&A_3\&!A_4\&!A_5\&!A_6)|$
   $(B_0\&!B_1\&!B_2)$
)&
(
   (!A0&!A1&!A2&!A3&A4&!A5&!A6)|
   (A0&!A1&!A2&!A3&!A4&!A5&!A6)|
   (!A0&!A1&!A2&!A3&!A4&A5&!A6)|
   (!A0&!A1&!A2&!A3&!A4&!A5&A6)|
   (!A0&A1&!A2&!A3&!A4&!A5&!A6)
)&
(
   (B0&!B1&!B2)|
   (!B0&B1&!B2)|
   (!B0&!B1&B2)
)

At block 410, the procedure logically reduces the conjunction of the Boolean expressions resulting from block 408 to a single canonical sum of products expression, yielding $(A_0\&!A_1\&!A_2\&!A_3\&!A_4\&!A_5\&!A_6\&B_0\&!B_1\&!B_2)|$
$(A_0\&!A_1\&!A_2\&!A_3\&!A_4\&!A_5\&!A_6\&!B_0\&B_1\&!B_2)|$
$(A_0\&!A_1\&!A_2\&!A_3\&!A_4\&!A_5\&!A_6\&!B_0\&!B_1\&B_2)|$
$(!A_0\&A_1\&!A_2\&!A_3\&!A_4\&!A_5\&!A_6\&B_0\&!B_1\&!B_2)|$
$(!A_0\&A_1\&!A_2\&!A_3\&!A_4\&!A_5\&!A_6\&!B_0\&B_1\&!B_2)|$
$(!A_0\&A_1\&!A_2\&!A_3\&!A_4\&!A_5\&!A_6\&!B_0\&!B_1\&B_2)|$
$(!A_0\&!A_1\&!A_2\&!A_3\&A_4\&!A_5\&!A_6\&B_0\&!B_1\&!B_2)|$
$(!A_0\&!A_1\&!A_2\&!A_3\&!A_4\&A_5\&!A_6\&B_0\&!B_1\&!B_2)|$
$(!A_0\&!A_1\&!A_2\&!A_3\&!A_4\&!A_5\&A_6\&B_0\&!B_1\&!B_2)$ This is performed using any standard logic-reduction algorithm, such as the commonly used Quine-McCluskey algorithm.

At block 412, the procedure removes any negated variable symbols from the sum of products expression, resulting in:

$(A_0\&B_0)|$
$(A_0\&B_1)|$
$(A_0\&B_2)|$
$(A_1\&B_0)|$
$(A_1\&B_1)|$
$(A_1\&B_2)|$
$(A_4\&B_0)|$
$(A_5\&B_0)|$
$(A_6\&B_0)$

This removal operation valid because any negated variable symbol is redundant—the truth of any variable relating to a single negotiable parameter implies the negation of all other variables relating to the same negotiable parameter.

At block 414, the procedure replaces any remaining variable symbols with the corresponding constraints, effectively reversing the operation performed in the substitution operation (i.e., see, block 404), yielding the following expression:

(A=2&B=2)|
(A=2&B=5)|
(A=2&B=10)|
(A=<3:4>&B=2)|
(A=<3:4>&B=5)|
(A=<3:4>&B=10)|
(B=2&A=<1:2>)|
(B=2&A=<2:3>)|
(B=2&A=3)

This is a correct formulation of the intersection, although it could be reformatted if human readability were a concern.

An Exemplary Operating Environment

FIG. 5 and the corresponding discussion are intended to provide a general description of a suitable computing environment in which the described arrangements and procedures to negotiate negotiable parameters between interconnected components may be implemented. Exemplary computing environment 520 is only one example of a suitable computing environment and is not intended to suggest any limitation as to the scope of use or functionality of the described subject matter. For example, another exemplary system/environment is described above in reference to FIG. 2. Neither should the computing environment 520 be interpreted as having any dependency or requirement relating to any one or combination of components illustrated in the exemplary computing environment 520.

The exemplary arrangements and procedures to negotiate negotiable parameters between interconnected components are operational with numerous other general purpose or special purpose computing system environments or configurations. Examples of well known computing systems, environments, and/or configurations that may be suitable for use with the described subject matter include, but are not limited to, personal computers, server computers, thin clients, thick clients, hand-held or laptop devices, multiprocessor systems, microprocessor-based systems, mainframe computers, distributed computing environments such as server farms and corporate intranets, and the like, that include any of the above systems or devices.

The computing environment 520 includes a general-purpose computing device in the form of a computer 530. Computer 530 could serve as an exemplary implementation of the gateway device 202 of FIG. 2. The components of computer 520 may include, by are not limited to, one or more processors or processing units 532, a system memory 534, and a bus 536 that couples various system components including the system memory 534 to the processor 532.

Bus 536 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 530 typically includes a variety of computer readable media. Such media may be any available media that is accessible by computer 530, and it includes both volatile and non-volatile media, removable and non-removable media.

The system memory includes computer readable media in the form of volatile memory, such as random access memory (RAM) 540, and/or non-volatile memory, such as read only memory (ROM) 538. A basic input/output system (BIOS) 542, containing the basic routines that help to transfer information between elements within computer 530, such as during start-up, is stored in ROM 538. RAM 540 typically contains data and/or program modules that are immediately accessible to and/or presently be operated on by processor 532.

Computer 530 may further include other removable/non-removable, volatile/non-volatile computer storage media. By way of example only, FIG. 5 illustrates a hard disk drive 544 for reading from and writing to a non-removable, non-volatile magnetic media (not shown and typically called a "hard drive"), a magnetic disk drive 546 for reading from and writing to a removable, non-volatile magnetic disk 548 (e.g., a "floppy disk"), and an optical disk drive 550 for reading from or writing to a removable, non-volatile optical disk 552 such as a CD-ROM, DVD-ROM or other optical media. The hard disk drive 544, magnetic disk drive 546, and optical disk drive 550 are each connected to bus 536 by one or more interfaces 554.

The drives and their associated computer-readable media provide nonvolatile storage of computer readable instructions, data structures, program modules, and other data for computer 530. Although the exemplary environment described herein employs a hard disk, a removable magnetic disk 548 and a removable optical disk 552, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 548, optical disk 552, ROM 538, or RAM 540, including, by way of example, and not limitation, an operating system 558, one or more application programs 560 (e.g., application programs 212 of FIG. 2), other program modules 562, and program data 564 (e.g., the program data 520 of FIG. 5).

A user may enter commands and information into computer 530 through optional input devices such as keyboard 566 and pointing device 568 (such as a "mouse"). Other input devices (not shown) may include a microphone, joystick, game pad, satellite dish, serial port, scanner, or the like. These and other input devices are connected to the processing unit 532 through a user input interface 570 that is coupled to bus 536, but may be connected by other interface and bus structures, such as a parallel port, game port, or a universal serial bus (USB).

An optional monitor 572 or other type of display device is connected to bus 536 via an interface, such as a video adapter 574. In addition to the monitor, personal computers typically include other peripheral output devices (not shown), such as speakers and printers, which may be connected through output peripheral interface 575.

Computer 530 may operate in a networked environment using logical connections to one or more remote computers, such as a remote computer 582. Remote computer 582 may include many or all of the elements and features described herein relative to computer 530.

Logical connections shown in FIG. 5 are a local area network (LAN) 577 and a general wide area network (WAN) 579. Such networking environments are commonplace in offices, enterprise-wide computer networks, intranets, and the Internet.

When used in a LAN networking environment, the computer 530 is connected to LAN 577 via network interface or adapter 586. When used in a WAN networking environment, the computer typically includes a modem 578 or other means for establishing communications over the WAN 579. The modem 578, which may be internal or external, may be connected to the system bus 536 via the user input interface 570 or other appropriate mechanism.

Depicted in FIG. 5, is a specific implementation of a WAN via the Internet. Computer 530 typically includes a modem 578 or other means for establishing communications over the Internet 580. Modem 578, which may be internal or external, is connected to bus 536 via interface 570.

In a networked environment, program modules depicted relative to the personal computer 530, or portions thereof, may be stored in a remote memory storage device. By way of example, and not limitation, FIG. 5 illustrates remote application programs 589 as residing on a memory device of remote computer 582. It will be appreciated that the network connections shown and described are exemplary and other means of establishing a communications link between the computers may be used.

Computer-Executable Instructions

An implementation of an exemplary system to determine a substantially optimal set of negotiable parameters between networked components may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of an exemplary an exemplary system to determine a substantially optimal set of negotiable parameters between networked components may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the described arrangements and procedures to negotiate negotiable parameters between interconnected components have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:

1. In a distributed computing system, a method for negotiating parameters between a plurality of networked components, each component being coupled to other particular ones of the components over a respective communication path, the method comprising:

specifying parameter sets corresponding respectively to at least two of the components, each parameter set indicating a limited domain of parameters supported by a computing system coupled to a port;

logically intersecting the parameter sets to form a parameter set intersection; and selecting negotiable parameter values from the parameter set intersection.

2. A method as recited in claim 1, wherein parameters of the parameter sets comprise operating parameters and preferences.

3. A method as recited in claim 1, where a first component of the at least two components is a multimedia source, and wherein one or more additional components of the at least two components are respective multimedia sinks.

4. A method as recited in claim 1, wherein specifying parameter sets further comprises specifying one or more constraints on negotiable parameter values, and wherein intersecting the parameter sets is performed by logically conjoining the constraints on the negotiable parameter values.

5. A method as recited in claim 4, wherein logically conjoining the constraints on the negotiable parameter values further comprises:

specifying each parameter set as a Boolean expression of the constraints;

manipulating each Boolean expression as follows:
logically expanding any constraints in the expression that relate to a common negotiated parameter into a plurality of constraints that are mutually exclusive; and logically conjoining each constraint that relates to a particular negotiated parameter with the negation of all other constraints relating to the same negotiated parameter;

logically conjoining the manipulated Boolean expressions;

logically reducing the conjoined Boolean expressions, resulting in a reduced Boolean expression; and removing any redundant constraints from the reduced Boolean expression.

6. A method as recited in claim 5, wherein specifying parameter sets comprises specifying each constraint as a parameter identifier with a corresponding value scope.

7. A method as recited in claim 6, wherein specifying parameter sets further comprises specifying value scopes as single values and as ranges of values.

8. A method as recited in claim 4 wherein the step of specifying parameter sets further comprises specifying each constraint as a parameter identifier with a corresponding value scope.

9. A method as recited in claim 8, wherein specifying parameter sets further comprises specifying value scopes as single values and as ranges of values.

10. A method as recited in claim 4, and further comprising specifying each parameter set as a Boolean expression of the constraints.

11. A method as recited in claim 10, wherein specifying parameter sets further comprises specifying each constraint as a parameter identifier with a corresponding value scope.

12. A method as recited in claim 11, wherein specifying parameter sets further comprises specifying value scopes as single values and as ranges of values.

13. A method as recited in claim 12, wherein logically conjoining the constraints on the negotiable parameter values further comprises:

manipulating each Boolean expression as follows:
logically expanding any constraints in the expression that relate to a common negotiated parameter into a plurality of constraints that are mutually exclusive;
substituting a corresponding variable symbol for each different constraint in the expression; and
logically conjoining each variable symbol substituted for a particular constraint that relates to a particular negotiated parameter with negation of all other variable symbols substituted for constraints relating to a same negotiated parameter;

logically conjoining manipulated Boolean expressions;

logically reducing conjoined Boolean expressions, resulting in a reduced Boolean expression;

removing any negated variable symbols from the reduced Boolean expression; and replacing remaining variable symbols with corresponding constraints.

14. In a multimedia distribution system of networked components having interconnectable ports, wherein interconnections are to be formed among. groups of the ports and their respective components, a method of negotiating negotiable parameters among a plurality of the ports comprising:

(a) specifying parameter sets corresponding respectively to the ports, each parameter set indicating a limited domain of the negotiable parameters supported by a component for a corresponding port;

(b) logically intersecting the parameter sets supported by a group of components for a group of ports that are to be interconnected;

(c) limiting parameter sets of one or more ports of the group of components based on results of the intersecting step;

(d) reiterating steps (b) and (c) for different groups of components and ports that are to be interconnected, using the parameter sets corresponding to individual ports of the different groups as limited by any preceding iterations of steps (b) and (c); and (e) selecting values for the negotiable parameters from the parameter sets as limited by (b), (c), and (d).

15. A method as recited in claim 14, wherein a first plurality of the ports correspond to a gateway device, and wherein a second plurality of the ports correspond to one or more multimedia sinks.

16. A method as recited in claim 14, and further comprising repeating (b) and (c) until further repetitions do not further limit the parameter sets.

17. A method as recited in claim 14, wherein the one or more ports of (c) include ports other than the ports that are to be interconnected.

18. A method as recited in claim 14, wherein specifying parameter sets comprises specifying one or more constraints on negotiable parameter values, and wherein intersecting the parameter sets is performed by logically conjoining the constraints on the negotiable parameter values.

19. A method as recited in claim 18, wherein logically conjoining the constraints on the negotiable parameter values further comprises:

specifying each parameter set as a Boolean expression of the constraints;

manipulating each Boolean expression as follows:
logically expanding any constraints in the Boolean expression that relate to a common negotiated parameter into a plurality of constraints that are mutually exclusive;
logically conjoining each constraint that relates to a particular negotiated parameter with negation of all other constraints relating to a same negotiated parameter;

logically conjoining manipulated Boolean expressions;
logically reducing conjoined Boolean expressions, resulting in a reduced Boolean expression; and
removing any redundant constraints from the reduced Boolean expression.

20. A method as recited in claim 19, and further comprising repeating steps (b) and (c) until further repetitions do not further limit the parameter sets.

21. A method as recited in claim 18, wherein specifying parameter sets further comprises specifying each constraint as a parameter identifier with a corresponding value scope.

22. A method as recited in claim 21, wherein specifying parameter sets further comprises specifying value scopes as single values and as ranges of values.

23. An audio/visual distribution gateway device comprising:

a processor coupled to a memory, the memory comprising computer executable instructions, the processor being configured to fetch and execute the computer-executable instructions for:
identifying a plurality of parameter sets that correspond to a plurality of components having interconnectable ports, the components supporting for each port a limited domain of negotiable parameters defined by a respective parameter set;
logically intersecting the parameter sets of at least two ports that are to be interconnected to generate a parameter set intersection; and
selecting negotiable parameter values for interconnection of the at least two ports from the parameter set intersection.

24. A gateway device as recited in claim 23, wherein at least a subset of the components correspond to one or more multimedia sink devices, the multimedia sink devices being coupled over a network to the gateway device.

25. A gateway device as recited in claim 23, wherein the processor is further configured to fetch and execute the computer-executable instructions for specifying parameter sets of the interconnectable ports as one or more constraints on negotiable parameter values, and wherein intersecting the parameter sets is performed by logically conjoining the constraints on the negotiable parameter values.

26. A gateway device as recited in claim 25, wherein the computer-executable instructions for conjoining the constraints on the negotiable parameter values further comprise instructions for:

specifying each parameter set as a Boolean expression of the constraints;

manipulating each Boolean expression as follows:
logically expanding any constraints in the expression that relate to a common negotiated parameter into a plurality of constraints that are mutually exclusive;
logically conjoining each constraint that relates to a particular negotiated parameter with the negation of all other constraints relating to a same negotiated parameter;

logically conjoining manipulated Boolean expressions;
logically reducing conjoined Boolean expressions, resulting in a reduced Boolean expression; and
removing any redundant constraints from the reduced Boolean expression.

27. A gateway device as recited in claim 26, wherein the computer-executable instructions for specifying parameter sets further comprise instructions for specifying each constraint as a parameter identifier with a corresponding value scope.

28. A gateway device as recited in claim 27, wherein the computer-executable instructions for specifying parameter sets further comprise instructions for specifying value scopes as single values and as ranges of values.

29. A gateway device as recited in claim 24, wherein the computer-executable instructions for specifying parameter sets further comprise instructions for specifying each constraint as a parameter identifier with a corresponding value scope.

30. A gateway device as recited in claim 29 wherein the computer-executable instructions for specifying parameter sets further comprise instructions for specifying value scopes as single values and as ranges of values.

31. A gateway device as recited in claim 24, wherein the computer-executable instructions for specifying parameter sets further comprise instructions for specifying each parameter set as a Boolean expression of one or more constraints.

32. A gateway device as recited in claim 31, wherein the computer-executable instructions for specifying parameter sets further comprise instructions for specifying each constraint as a parameter identifier with a corresponding value scope.

33. A gateway device as recited in claim 32, wherein the computer-executable instructions for specifying parameter sets further comprise instructions for specifying value scopes as single values and as ranges of values.

34. A gateway device as recited in claim 33, wherein the computer-executable instructions further comprise instructions for:

manipulating each Boolean expression as follows:
  logically expanding any constraints in the Boolean expression that relate to a common negotiated parameter into a plurality of constraints that are mutually exclusive;
  substituting a corresponding variable symbol for each different constraint in the Boolean expression;
  logically conjoining each variable symbol substituted for a particular constraint that relates to a particular negotiated parameter with negation of all other variable symbols substituted for constraints relating to a same negotiated parameter;
logically conjoining manipulated Boolean expressions;
logically reducing conjoined Boolean expressions, resulting in a reduced Boolean expression;
removing any negated variable symbols from the reduced Boolean expression; and
replacing remaining variable symbols with corresponding constraints.

35. A computer-readable medium comprising computer-executable instructions for negotiating parameters between a plurality of interconnected components, each component being coupled to other particular ones of the components over a respective network communication path, the computer-executable instructions comprising instructions for:
  specifying parameter sets corresponding respectively to at least two of the components, each parameter set indicating a limited domain of the parameters supported by a computing system coupled to a port;
  logically intersecting the parameter sets to form a parameter set intersection; and
  selecting negotiable parameter values from the parameter set intersection.

36. A computer-readable medium as recited in claim 35, wherein parameters of the parameter sets comprise operating parameters and preferences.

37. A computer-readable medium as recited in claim 35, where a first component of the at least two components is a multimedia source, and wherein one or more additional components of the at least two components are respective multimedia sinks.

38. A computer-readable medium as recited in claim 35, wherein the instructions for specifying parameter sets further comprise instructions for specifying one or more constraints on negotiable parameter values, and wherein intersecting the parameter sets is performed by logically conjoining the constraints on the negotiable parameter values.

39. A computer-readable medium as recited in claim 38, wherein the instructions for logically conjoining the constraints on the negotiable parameter values further comprise instructions for:
  specifying each parameter set as a Boolean expression of the constraints;
  manipulating each Boolean expression as follows:
    logically expanding any constraints in the expression that relate to a common negotiated parameter into a plurality of constraints that are mutually exclusive; and
    logically conjoining each constraint that relates to a particular negotiated parameter with the negation of all other constraints relating to the same negotiated parameter;
  logically conjoining the manipulated Boolean expressions;
  logically reducing the conjoined Boolean expressions, resulting in a reduced Boolean expression; and
  removing any redundant constraints from the reduced Boolean expression.

40. A computer-readable medium as recited in claim 39, wherein the instructions for specifying parameter sets further comprise instructions for specifying each constraint as a parameter identifier with a corresponding value scope.

41. A computer-readable medium as recited in claim 40, wherein the instructions for specifying parameter sets further comprise instructions for specifying value scopes as single values and as ranges of values.

42. A computer-readable medium as recited in claim 38, wherein the instructions for specifying parameter sets further comprise instructions for specifying each constraint as a parameter identifier with a corresponding value scope.

43. A computer-readable medium as recited in claim 42, wherein the instructions for specifying parameter sets further comprise instructions for specifying value scopes as single values and as ranges of values.

44. A computer-readable medium as recited in claim 38, and further comprising computer-executable instructions for specifying each parameter set as a Boolean expression of the constraints.

45. A computer-readable medium as recited in claim 44, wherein the instructions for specifying parameter sets further comprise instructions for specifying each constraint as a parameter identifier with a corresponding value scope.

46. A computer-readable medium as recited in claim 45, wherein the instructions for specifying parameter sets further comprise instructions for specifying value scopes as single values and as ranges of values.

47. A computer-readable medium as recited in claim 46, wherein the instructions for logically conjoining the constraints on the negotiable parameter values further comprise instructions for:
  manipulating each Boolean expression as follows:
    logically expanding any constraints in the expression that relate to a common negotiated parameter into a plurality of constraints that are mutually exclusive;
    substituting a corresponding variable symbol for each different constraint in the expression; and
    logically conjoining each variable symbol substituted for a particular constraint that relates to a particular negotiated parameter with negation of all other variable symbols substituted for constraints relating to a same negotiated parameter;
  logically conjoining manipulated Boolean expressions;
  logically reducing conjoined Boolean expressions, resulting in a reduced Boolean expression;
  removing any negated variable symbols from the reduced Boolean expression; and
  replacing remaining variable symbols with corresponding constraints.

* * * * *